US 6,524,062 B2
United States Patent
Lathrop et al.
(10) Patent No.: US 6,524,062 B2
(45) Date of Patent: Feb. 25, 2003

(54) RETENTION SLEEVE FOR A THERMAL MEDIUM CARRYING TUBE IN A GAS TURBINE

(75) Inventors: Norman Douglas Lathrop, Ballston Lake, NY (US); Robert Paul Czachor, Cincinnati, OH (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/618,800

(22) Filed: Jul. 18, 2000

(65) Prior Publication Data

US 2002/0064459 A1 May 30, 2002

Related U.S. Application Data

(63) Continuation of application No. 09/312,334, filed on May 14, 1999, now abandoned.

(51) Int. Cl.$^7$ .................................................. F01D 5/14
(52) U.S. Cl. ........................ 415/115; 415/116; 415/134; 416/96 R
(58) Field of Search ................................ 415/114, 115, 415/116, 134, 135; 416/95, 96 A, 96 R

(56) References Cited

U.S. PATENT DOCUMENTS 5,593,274 A * 1/1997 Carreno et al. ............. 415/115
5,867,976 A 2/1999 Ziegler, Jr.

FOREIGN PATENT DOCUMENTS

EP 0 860 587 A2 8/1998
GB 913167 12/1962

OTHER PUBLICATIONS

"39$^{th}$ GE Turbine State–of–the–Art TechnologySeminar", Tab 1, ""F" Technolgy –the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

(List continued on next page.)

Primary Examiner—F. Daniel Lopez
Assistant Examiner—James M McAleenan
(74) Attorney, Agent, or Firm—Nixon & Vanderhye

(57) ABSTRACT

Multiple tubes are connected to steam supply and spent cooling steam return manifolds for supplying cooling steam to buckets and returning spent cooling steam from the buckets to the manifolds, respectively. The tubes are prevented from axial movement in one direction by flanges engaging end faces of the spacer between the first and second-stage wheels. Retention sleeves are disposed about cantilevered ends of the tubes. One end of the retention sleeve engages an enlarged flange on the tube, while an opposite end is spaced axially from an end face of the adjoining wheel, forming a gap, enabling thermal expansion of the tubes and limiting axial displacement of the tube in the opposite direction.

18 Claims, 3 Drawing Sheets

OTHER PUBLICATIONS

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, " J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 – Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document#1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Informantion, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C. Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion",Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine – High Efficiency, Low Cost of Electricity and Low Emissions", Roger Schonewald and Patrick Marolda, (no date available),.

"Testing Program Results Validate GE's H Gas Turbine – High Efficiency, Low Cost of Electricity and Low Emmisons", Slide Presentation –working draft, (no date available).

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1—Dec. 31, 1995, Publication Date, May 1, 1997, Report Numbers: DOE/MC/31176—5340.

"Utility Advanced Turbine System (ATS) Technology Readiness Testing and Pre–Commercial Demonstration – Phase 3", Document #486132, Apr. 1 –Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration — Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing: Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

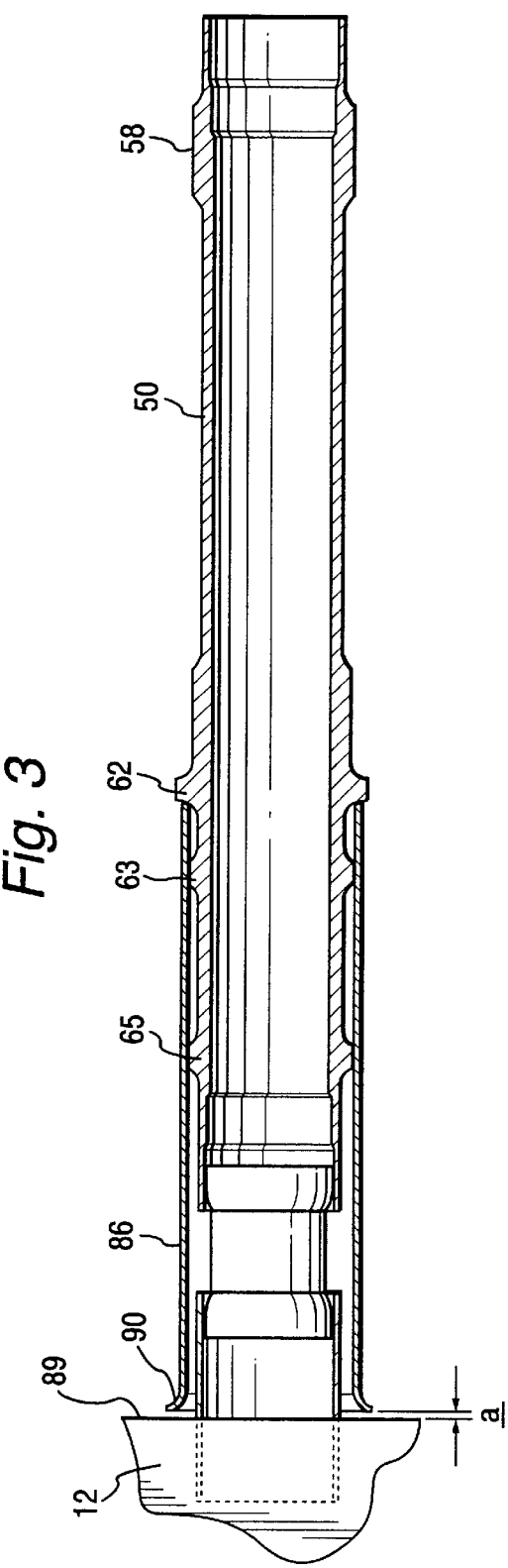
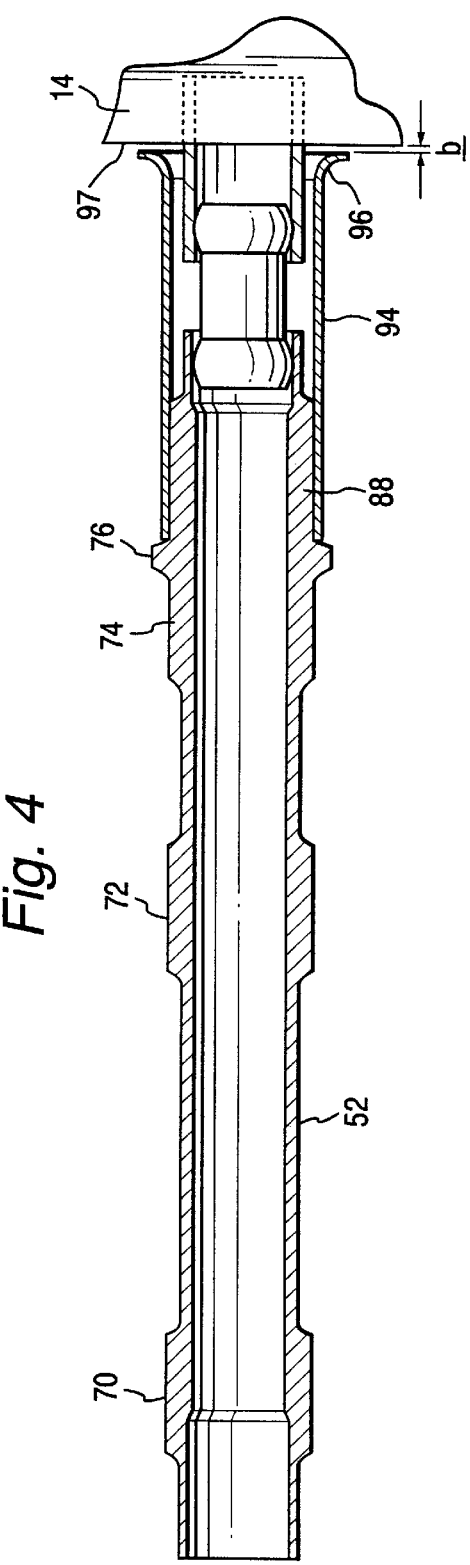

RETENTION SLEEVE FOR A THERMAL MEDIUM CARRYING TUBE IN A GAS TURBINE

RELATED APPLICATIONS

This application is a continuation of application Ser. No. 09/312,334, filed May 14, 1999 now abandoned, the disclosure of which is incorporated herein by reference.

This invention was made with Government support under Contract No. DE-FC21-95MC31176 awarded by the Department of Energy. The Government has certain rights in this invention.

TECHNICAL FIELD

The present invention relates to cooling medium supply and return tubes for conveying cooling medium to and from the buckets of a gas turbine and particularly relates to retention sleeves for preventing unrestrained axial movement of the thermal medium supply and return tubes, e.g., due to thermal response.

BACKGROUND OF THE INVENTION

In an advanced gas turbine design for industrial power generation, the rotating buckets on the turbine rotor are preferably cooled by supplying a thermal medium, for example, steam, to the buckets. The steam is supplied generally through an axial bore tube assembly and radial tubes to a plurality of circumferentially spaced supply tubes extending axially adjacent the rim of the rotor. The supply tubes extend through openings in the stacked wheel and spacer arrangement of the rotor and communicate with a supply manifold adjacent a forward portion of the rotor. The manifold, in turn, includes a plurality of cross-tubes for supplying the steam to the forwardmost wheel and buckets carried thereby. Cooling steam is also supplied from the supply manifold to the buckets of the second-stage wheel. Spent cooling steam flows from the buckets of the first-stage wheel to a return manifold. Spent cooling steam also flows from the buckets of the second-stage wheel via a plurality of cross-tubes to the return manifold. The spent cooling steam is conveyed from the return manifold to the aft end of the rotor by way of return tubes circumferentially spaced about the rotor rim. The return tubes lie in communication with radially extending tubes whereby the spent cooling medium is returned axially through the bore tube assembly to a steam source or for use in steam turbines in a combined-cycle system.

Supply and return cross-tubes have in the past been provided with self-locking threaded inserts to retain the tube against axial movement. However, such designs are not acceptable because they require machine threads in the spacer wheel and limit access to the removed threaded insert if it is damaged. The cross-tubes must, however, be restrained from axial movement, e.g., motion caused by thermal response. During turbine startup and shutdown, the cross-tubes can thermally bind and unbind, causing the tubes to move axially, e.g., due to such thermal ratcheting. This causes the steam seals to disengage with subsequent loss of cooling to the buckets. There has thus developed a need for a removable, easily maintained device which can withstand high operating temperatures and large accelerations, have high cycle fatigue endurance, will not buckle under loads caused by thermal ratcheting and does not adversely affect the design of the spacer wheel.

BRIEF SUMMARY OF THE INVENTION

In accordance with a preferred embodiment of the present invention, there is provided a cross-tube retention sleeve for preventing axial movement of the thermal medium cross-tubes, e.g., due to thermal ratcheting and which does not adversely affect the performance of the spacer wheel. It will be appreciated that the cross-tubes extend through openings in the spacer and are cantilevered from axial end faces of the spacer. Spoolies interconnect the ends of the cross-tubes with additional passages in the wheels mounting the buckets. Spoolies comprise sleeves having spherical end portions for engaging within cylindrical ends of adjoining but spaced tubes. To prevent axial movement of the cross-tubes which might disengage or cause leakage in the spoolies, the present invention provides an axial retention sleeve for overlying the cantilevered end of each cross-tube between the spacer mounting the cross-tube and the end face of an adjoining wheel. Particularly, each cross-tube has a radial flange against which one end of a retention sleeve bears. The opposite end of the retention sleeve is spaced axially from the end face of the adjacent wheel, forming an axial gap accommodating limited axial movement of the retention sleeve. This limited axial movement accommodates movement, for example, resulting from thermal expansion of the cross-tubes but limits the movement to preclude binding of the tubes and disruption of the seals.

In a preferred embodiment according to the present invention, there is provided in a gas turbine rotor having stacked wheels and spacers and tubes for conveying a thermal medium between buckets of one of the wheels and a manifold, the tubes extending generally in an axial direction in openings through a spacer adjacent a rim of the rotor and having radially outwardly directed flanges, retention sleeves for limiting axial movement of the tubes in a first axial direction, each retention sleeve having a first end in opposition to an end face of a rotor wheel forming an axial gap therebetween and a second end butting the flange, whereby axial movement of the tubes closes the gaps to prevent further axial movement of the tubes in the first axial direction.

In a further preferred embodiment according to the present invention, there is provided in a gas turbine rotor having stacked wheels and spacers and first tubes for supplying cooling steam to buckets of a first rotor wheel and second tubes for returning spent cooling steam from the buckets of a second rotor wheel, the tubes extending in a generally axial direction in openings through a spacer between the first and second rotor wheels and adjacent a rim of the rotor, each of the tubes having radially outwardly directed flanges, first and second retention sleeves for preventing axial movement of the first and second tubes in respective first and second axial directions, the first retention sleeves having first ends in opposition to an end face of the first rotor wheel and forming axial gaps therewith, the second retention sleeves having first ends in opposition to an end face of the second rotor wheel and forming axial gaps therewith, each of the first and second sleeves having second ends butting respective flanges of the first and second tubes, whereby axial movement of the tubes responsive to thermal expansion thereof closes the gaps to prevent further axial movement of the first and second tubes in the first and second axial directions, respectively.

BRIEF DESCRIPTION OF THE DRAWINGS

FIG. 3 is a longitudinal cross-sectional view of a supply cross-tube illustrating a retention sleeve on an end thereof; and FIG. 4 is a view similar to FIG. 3 illustrating a return cross-tube with the retention sleeve on an end thereof.

DETAILED DESCRIPTION OF THE INVENTION

Figure 1:
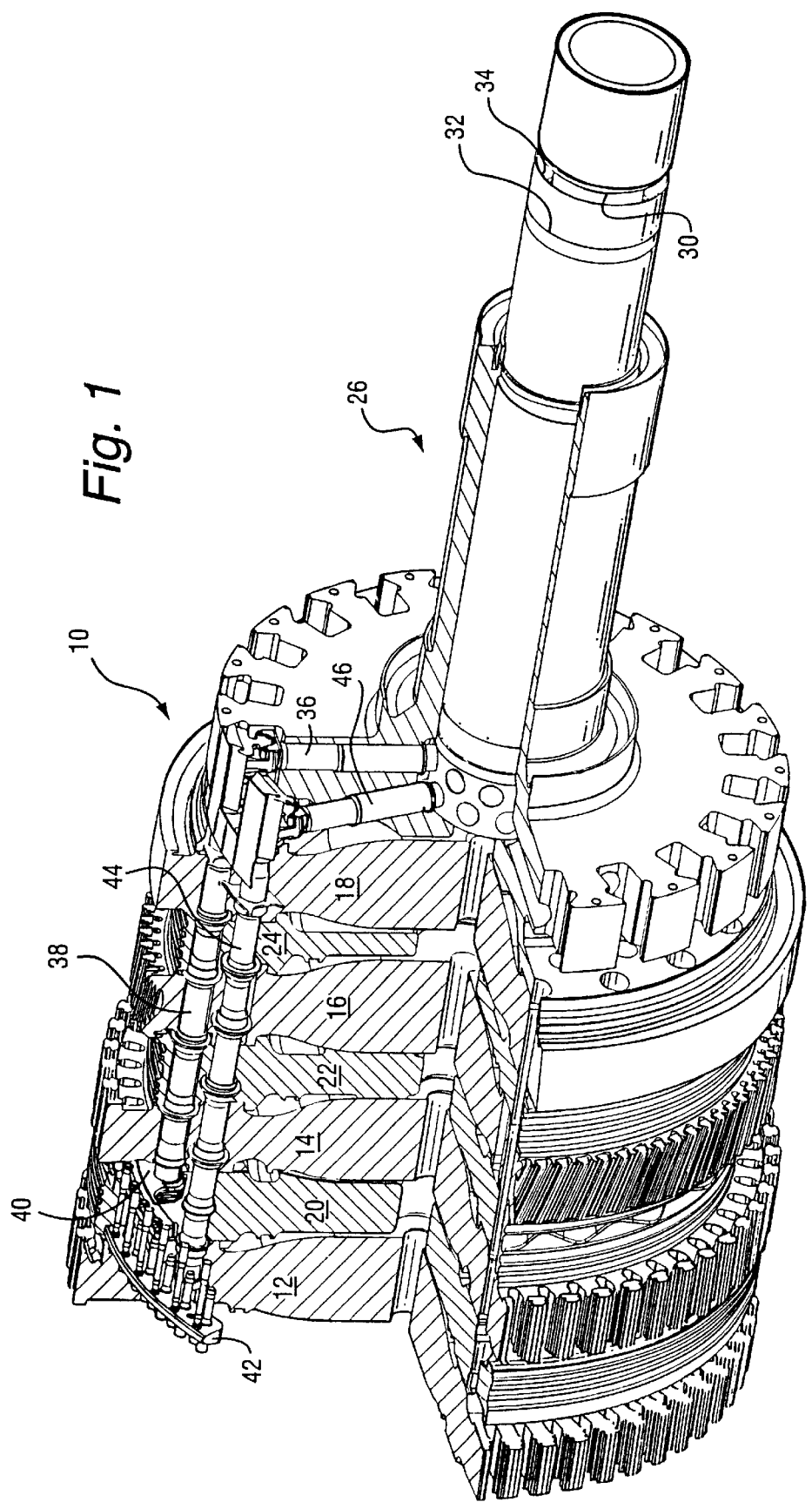
FIG. 1 is a perspective view of a portion of a gas turbine rotor with parts broken out and in cross-section illustrating cooling medium supply and return tubes and cross-tubes.

Referring to FIG. 1, there is illustrated a portion of a rotor, generally designated 10, for a gas turbine. The illustrated rotor comprises a plurality of wheels 12, 14, 16 and 18, with spacers 20, 22 and 24 alternately between the wheels. The wheels 12, 14, 16 and 18 mount buckets, not shown, while nozzles, also not shown, are disposed between the arrays of buckets in the hot gas path of the gas turbine. The stacked wheels and spacers are held together by a plurality of axially extending, elongated bolts, not shown. Additionally, the rotor includes an aft bore tube assembly, generally designated 26, which extends through an aft bearing, not shown, and includes inner and outer sleeves 30 and 32 defining an annulus 34 therebetween. The annulus 34 communicates with a plenum for supplying a cooling medium, e.g., steam, for flow axially through the annulus 34, through a plurality of circumferentially spaced, radially extending tubes 36 in communication with respective supply tubes 38. Supply tubes 38 comprise an array of tubes spaced circumferentially one from the other and extending axially through aligned openings in the wheels and spacers of the rotor and adjacent the rotor rim. The supply tubes 38 supply the cooling medium to a first manifold 40 for distributing the cooling medium to the turbine buckets, preferably the buckets secured to the first and second-stage wheels 12 and 14, respectively. A return manifold 42 communicates with the first and second-stage buckets for receiving spent cooling medium and returning the spent cooling medium through a plurality of circumferentially spaced return tubes 44 extending axially through aligned openings in the stacked wheels and spacers likewise adjacent the rotor rim. The tubes 44 communicate with radially extending tubes 46 for returning the steam axially along the bore tube assembly 26 within inner sleeve 30 for return to a steam supply or for use in steam turbines forming part of a combined-cycle system.

Figure 2:
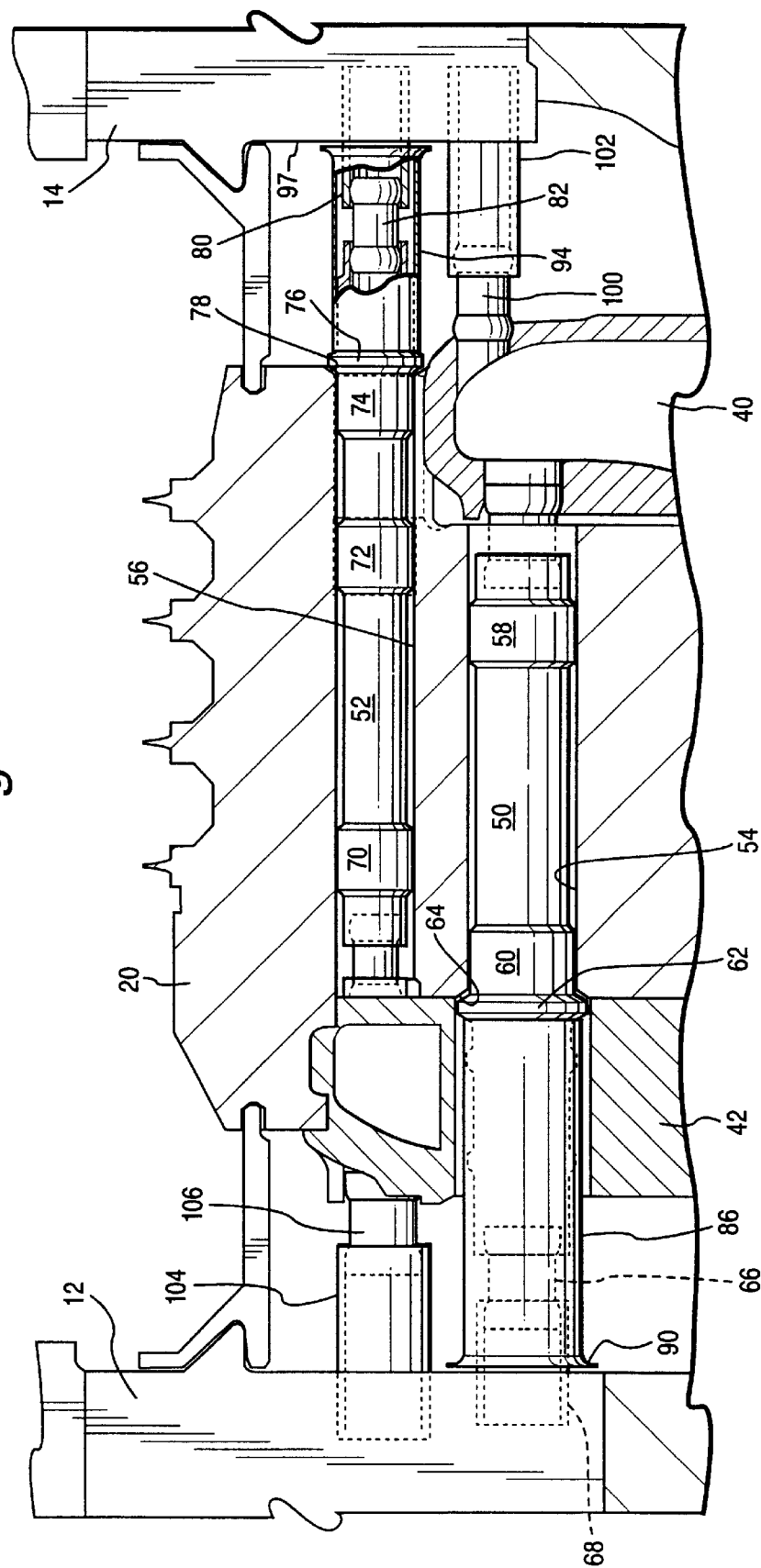
FIG. 2 is an enlarged fragmentary cross-sectional view of portions of the first and second-stage wheels and 1–2 spacer illustrating the cross-tubes and retention sleeve constructed in accordance with the present invention.

More particularly, and referring to FIG. 2, there is illustrated supply and return cross-tubes 50 and 52, respectively, disposed in bores 54 and 56 in the spacer 20 between wheels 12 and 14. The cross tubes 50 and 52 lie in communication with the supply and return manifolds 40 and 42, respectively. Cross tubes 50 supply cooling steam from supply manifold 40 to buckets of the first-stage wheel and cross tube 52 returns spent cooling steam from the second-stage buckets to the return manifold 42. Cross-tube 50 comprises a cylindrical tube having a diametrically enlarged portion 58 adjacent an aft end thereof and a diametrically enlarged portion 60 intermediate its opposite ends. Additionally, cross tube 50 includes a radially enlarged flange 62 at the forward end of enlarged portion 60 and which flange 62 is chamfered and seats against a corresponding chamfer 64 at the forward end of the opening 54 through spacer 20. The cross tube 50 extends forwardly in a direction toward the first-stage wheel 12 and mounts a pair of axially spaced flanges 63 and 65 forming retention sleeve standoffs on a cantilevered forward end portion of tube 50. As illustrated by the dashed lines in FIG. 2, the forward end of cross tube 50 communicates with a spoolie 66, in turn, in communication with a shortened tube 68. Short tube 68 lies in communication with passages, not shown, opening into a certain bucket of the first-stage wheel 12. It will be appreciated from a review of FIG. 2 that the cross tube 50 is fixed against axial movement in the aft direction, i.e., from left to right in FIG. 2, by the engagement of the flange 62 against the chamfered face 64 of the spacer 20. However, the tube 50 is otherwise free for axial movement in the opposite direction but for the retention sleeve described hereinafter.

The cross tube 52 similarly includes a diametrically enlarged portion 70 adjacent one end, intermediate portion 72 and portion 74 adjacent the aft end of tube 52. The portions 70, 72 and 74 seat the tube 52 in the opening 56 of spacer 20. An enlarged diameter flange 76 carried by tube 52 adjacent its aft end engages a chamfered surface 78 about the opening 56 at the aft face of spacer 20. The tube 52 extends aft short of the forward face of the second-stage wheel 14 and lies in communication with a short tube 80 by way of a spoolie 82. Consequently, like the supply tube 50, return tube 52 is fixed against axial movement in one direction, in this case in a forward axial direction, by the engagement of flange 76 against the chamfer 78. Cross tube 52 is, however, free for axial movement in an opposite direction but for a retention sleeve, which will now be described.

Referring to FIG. 3, the cantilevered forward end of each cross tube 50 is provided with a cylindrical retention sleeve 86. Sleeve 86 is open at its opposite ends and has an inside diameter for telescopic engagement about the flanges 63 and 65 of cross tube 50. The aft end of retention sleeve 86 butts against the enlarged flange 62. The opposite end of the retention sleeve 86 is flared outwardly at 90 and is spaced axially from the aft end face 89 of the stage 1 wheel 12, defining an axial gap a therebetween. It will be appreciated from a review of FIGS. 2 and 3 that the cross-tube 50 is prevented from axial movement in an aft direction by engagement of flange 62 against the chamfered face 64 of spacer 20. Cross tube 50 is limited in its axial forward movement by the engagement between flange 62 and the aft end of retention sleeve 86 and engagement of the forward flared end 90 of retention sleeve 86 against the aft end face 89 of wheel 12. The axial gap a between the flared end 90 and end face 89 of wheel 12 accommodates axial thermal expansion of the tube 50. This axial gap a enables a very limited extent of axial movement which prevents unacceptably high thermal buckling stresses from developing and facilitates installation of the cross tube 50 and sleeve 86. The flared end 90 precludes wear on the wheel face 89 or binding of the retention sleeve 86 during start-up which would otherwise cause high bending stresses in the cross-tube. Also, the inside diameter of sleeve 86 is larger than the seal diameter of the spoolies with the sleeve 68 and tube 50 thereby preventing contact therewith which would otherwise damage the seal. As illustrated, the retention sleeve is cantilevered for support on the projecting and similarly cantilevered forward end of the cross tube 50.

In similar fashion, the return tube 52 has an enlarged diameter cantilevered portion 88 at its aft end for receiving the forward end of a retention sleeve 94. As illustrated in FIGS. 2 and 4, the forward end of retention sleeve 94 butts the aft end of flange 76, while the aft end of sleeve 94 is flared at 96 and is spaced axially from the forward face 97 of second-stage wheel 14 to define an axial gap b therebetween. Consequently, the tube 52 is fixed against axial movement in a forward direction by engagement of its flange 76 against the aft face of spacer 20. Cross tube 52 is limited in its axial rearward movement by the engagement between the flared end 96 and the forward end face 97 of wheel 14, e.g., upon axial thermal expansion of the tube. The retention sleeve 94 thus serves similar purposes as the retention sleeve 86 but in an opposite orientation vis-a-vis the rotor.

As can be best exemplified by reference to FIG. 2, the cooling steam supplied through the supply tubes 38 enters the manifold 40 for distribution to the cross-tubes 50, there being preferably six cross-tubes supplied with thermal medium from each supply tube 38. Steam flows from the supply manifold 40 through the cross-tubes 50 and into the tubes 68 for distribution into the associated buckets of the first-stage wheel. The supply steam is also provided the buckets of the second-stage via spoolies 100 and sleeves 102 in communication with the supply manifold 40. Spent cooling steam is returned from the second-stage buckets via sleeve 80 and spoolie 82 into the cross-tube 52 for flow into the return manifold 42. Spent cooling steam from the first-stage buckets is provided manifold 42 by way of tubes 104 and spoolies 106, coupled to the first-stage wheel 12. Spent cooling steam is returned from manifold 42 via return tube 44, radial tubes 46, and along the axis of inner sleeve 30 to a steam supply or to steam turbines of a combined-cycle system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine rotor having stacked wheels and spacers and tubes for conveying a thermal medium between buckets of one of said wheels and a manifold, said tubes extending generally in an axial direction in openings through a spacer adjacent a rim of the rotor and having radially outwardly directed flanges, retention sleeves for limiting axial movement of said tubes in a first axial direction, each said retention sleeve having a first end in opposition to an end face of a rotor wheel forming an axial gap therebetween and a second end butting said flange, whereby axial movement of said tubes closes said gaps to prevent further axial movement of said tubes in said first axial direction.

2. A retention sleeve according to claim 1 wherein said first end of said retention sleeve is flared in a radial outward direction.

3. A retention sleeve according to claim 1 wherein said flange bears against said spacer to prevent axial movement of said tubes in a second axial direction opposite said first axial direction.

4. A retention sleeve according to claim 1 wherein each said tube includes a plurality of flanges spaced axially from one another forming stand-offs for said retention sleeve.

5. A retention sleeve according to claim 1 wherein an end portion of each tube is cantilevered from said spacer, said retention sleeve lying concentrically about said cantilevered portion of said tube and being wholly supported by said cantilevered portion of the tube.

6. A retention sleeve according to claim 1 wherein said first end of said retention sleeve is flared in a radial outward direction, said flange bearing against said spacer to prevent axial movement of each said tube in a second axial direction opposite said first axial direction.

7. A retention sleeve according to claim 6 wherein each said tube includes a plurality of flanges spaced axially from one another forming stand-offs for said retention sleeve.

8. A retention sleeve according to claim 7 wherein an end portion of each tube is cantilevered from said spacer, said retention sleeve lying concentrically about said cantilevered portion of said tube and being wholly supported by said cantilevered portion of the tube.

9. In a gas turbine rotor having stacked wheels and spacers and first tubes for supplying cooling steam to buckets of a first rotor wheel and second tubes for returning spent cooling steam from the buckets of a second rotor wheel, said tubes extending in a generally axial direction in openings through a spacer between said first and second rotor wheels and adjacent a rim of the rotor, each of said tubes having radially outwardly directed flanges, first and second retention sleeves for preventing axial movement of said first and second tubes in respective first and second axial directions, said first retention sleeves having first ends in opposition to an end face of said first rotor wheel and forming axial gaps therewith, said second retention sleeves having first ends in opposition to an end face of said second rotor wheel and forming axial gaps therewith, each said first and second sleeves having second ends butting respective flanges of said first and second tubes, whereby axial movement of said tubes responsive to thermal expansion thereof closes said gaps to prevent further axial movement of said first and second tubes in said first and second axial directions, respectively.

10. Retention sleeves according to claim 9 wherein said first ends of said retention sleeves are flared in a radial outward direction.

11. A retention sleeve according to claim 9 wherein said flanges bear against said spacer to prevent axial movement of said first and second tubes in respective second and first axial directions.

12. A retention sleeve according to claim 9 wherein each of said first tubes includes a plurality of flanges spaced axially from one another forming stand-offs for said retention sleeve.

13. A retention sleeve according to claim 9 wherein an end portion of each tube is cantilevered from said spacer, said retention sleeves lying concentrically about said cantilevered portions of said tubes and being wholly supported by said cantilevered portions of the tubes.

14. A retention sleeve according to claim 9 wherein said first ends of said retention sleeves are flared in a radial outward direction, said flanges bearing against said spacer to prevent axial movement of said first and second tubes in respective second and first axial directions.

15. A retention sleeve according to claim 14 wherein each of said first tube includes a plurality of flanges spaced axially from one another forming stand-offs for said retention sleeve.

16. A retention sleeve according to claim 13 wherein an end portion of each tube is cantilevered from said spacer, said retention sleeves lying concentrically about said cantilevered portions of said tubes and being wholly supported by said cantilevered portions of the tubes.

17. In a gas turbine rotor having stacked wheels and spacers and tubes for conveying a thermal medium and extending generally in an axial direction in openings through and adjacent a rim of the rotor, each tube having radially outwardly directed flanges, retention sleeves for limiting axial movement of said tubes in a first axial direction, each said retention sleeve having a first end in opposition to an end face of a rotor wheel and a second end in opposition to said flange, the distance between said rotor wheel end face and said flange being greater than the length of said retention sleeve, whereby axial movement of said tubes closes said distance to prevent further axial movement of said tubes in said first axial direction when said first and second ends of said retention sleeves engage said rotor wheel end faces and said flanges.

18. A retention sleeve according to claim 17 wherein said first end of said retention sleeve is flared in a radial outward direction.

* * * * *